March 11, 1969 W. A. MUSKA ET AL 3,432,793

GROUNDING CONNECTION FOR ELECTRICAL UNIT

Filed Nov. 14, 1966

INVENTORS
WILLIAM A. MUSKA
JAMES C. SCHACKER
EARL E. MCHATTIE

BY Stryker and Jacobson
ATTORNEYS 3,432,793

GROUNDING CONNECTION FOR ELECTRICAL UNIT

William A. Muska, 1378 Ryan Ave., Roseville, Minn. 55113, James C. Schacker, 1504 Edgewater, Arden Hills, Minn., and Earl E. McHattie, 2129 Midlothian Road, Roseville, Minn. 55113

Continuation-in-part of application Ser. No. 586,162, Oct. 12, 1966. This application Nov. 14, 1966, Ser. No. 594,177

U.S. Cl. 339—14 7 Claims

Int. Cl. H01r *3/06, 3/00;* H02b *1/02*

ABSTRACT OF THE DISCLOSURE

A metal clip is attached to the metal strap or yoke on an electrical unit such as a switch or receptacle to provide an automatic and reliable electrical circuit connection between the yoke and the metal flush box in which the unit is ordinarily mounted to ground the third connection.

This application is a continuation-in-part of copending application Ser. No. 586,162, filed Oct. 12, 1966.

This invention relates generally to the field of electrical connections. More specifically the invention is directed toward providing an automatic or inherent and reliable electrical grounding connection between an electrical unit such as is usually mounted in a wall, for example, an ordinary household wall receptacle or switch, and the metal flush box in which such a unit is usually mounted.

In copending application by the present applicants, Ser. No. 557,721, filed June 15, 1966, titled, Grounding Strap For Electrical Wall Receptacle, there is described in some detail the need for providing a relialbe, low resistance electrical grounding path which is automatically made for a three-socket wall receptacle when the receptacle is mounted in the wall. As described in more detail in said application, such a grounding path protects the operator of a piece of electrical equipment against dangerous electrical shorts that might occur in the equipment wiring. As a precaution the equipment, for example an ordinary household appliance, has a three-wire cord connected to a three-prong male plug. Two of the wires are there for their usual purpose. The third wire is connected to the exposed metal parts of the appliance so that in the event the appliance should become electrically "hot" because of a wiring fault or the like, a low resistance grounding circuit is provided to remove any dangerous potential from the exposed parts. In this event, the resulting momentary high current will ordinarily blow a fuse or other protective device. Even though this makes the equipment inoperable it also removes any danger to the operator. The receptacle in which the three-prong plug is ordinarily inserted is usually mounted in the wall in a metal flush box which is grounded electrically. This then provides a convenient place to which to connect the protective grounding third wire circuit. Although the grounding strap described in the aforementioned application functions capably in a variety of uses, there has been continuing activity to develop other grounding connections which may have broader application, which produce even lower resistance in the grounding circuit and which, in certain applications, are less expensive.

It is a general object of this invention to provide a convenient grounding part for the ground terminal in an electrical wall unit with very low resistance in the grounding circuit.

Another object of this invention is to achieve the foregoing objective in a manner which is relatively inexpensive to put into practice and use.

Still another object of this invention is to provide a very low resistance grounding circuit for a wall unit which will not be substantially affected by environmental conditions.

Yet another object of this invention is to achieve all of the foregoing objectives without adding any substantial bulk or weight to the wall unit at it is presently constructed.

Still a further object of this invention is to provide a low resistance grounding connection for an electrical unit which substantially eliminates the danger of fire in the event a high current grounding short does occur.

A feature of this invention is that the grounding circuit is automatically completed when the wall unit is mounted in its flush box so that it cannot be overlooked by the tradesmen or other when the unit is installed.

As a further feature, the grounding connection is made an integral or inherent part of the unit so that no additional hardware is required except for that which is ordinarily needed to attach the unit to its mounting flush box and to connect it into the circuit that it serves.

Another feature of the invention is that the mounting screws which are ordinarily packaged with the unit are retained in their usual position in a slot in the mounting yoke without the need of additional washers or the like which have been used heretofore.

These and other objects and features of this invention will become apparent during the course of the following detailed description with reference to the accompanying drawings in which.

Figure 1:
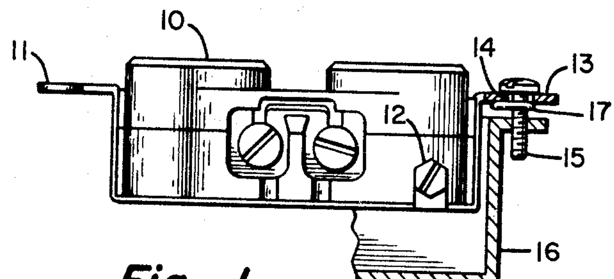
FIGURE 1 illustrates in general the usual manner of mounting a wall unit to its flush box to illustrate the manner in which the present invention is used to complete the grounding circuit between the unit and the flush box.

The invention will now be described as it is used in conjunction with the ordinary three-socket, double, wall receptacle. It should be understood that the invention is not necessarily limited to that use and can be used effectively with other wall units such as switches. In FIG. 1 the ordinary double wall socket 10 contains three sockets (not shown) on each half for mating with corresponding prongs of an electrical plug which is at the ends of a three-wire cable which is attached to some lectrical equipment in the well known fashion. Two of the prongs and their mating sockets are in the circuit path for providing energizing current to the equipment while the third provides a precautionary grounding path. The rceptacle 10 has the usual rigid metal mounting strap or yoke 11 which is connected electrically to a grounding terminal which, in turn, is electrically connected, by means not shown, to the ground sockets in the receptacle. In the usual fashion the yoke 11 has mounting ears 13 at each end which contain elongated slots 14 through which mounting screws 15 are inserted to attach the receptacle 10 to a metal flush box 16 which ordinarily is located in the wall. The flush box 16 is ordinarily electrically grounded so that it provides a convenient place to which to connect the ground terminal in the receptacle to complete the grounding path. Various electrical codes and specifications require that the ground circuit path has a very low resistance so that in the event a short should occur to ground one of the voltage lines, a large enough current is drawn instantaneously to blow the protective fuse or the like. Furthermore it is generally required that no sparking or arcing occurs to eliminate the possibility of a fire starting in the event of a short of this nature. It can be visualized that because the metal yoke 11 is made of relatively heavy metal and is solidly connected to the grounding terminal 12, it introduces negligible resistance in the grounding circuit. The similar heavy construction of the metal flush box make the same hold true for it. Therefore, the most likely place for resistance to be introduced in the grounding path is in making the connection between the yoke and the flush box. The present invention achieves the low resistance electrical contact between the yoke 11 and the flush box 16 by providing an electrical connection in a clip-like form, generally designated 17, which is attached to the underside of the yoke ears 13.

Figure 2:
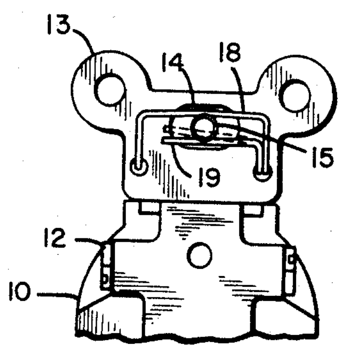
FIG. 2 is a somewhat exploded view of an embodiment of this invention showing in detail how it may be attached to the unit and the manner in which it provides the grounding connection.

Turning now to FIG. 2 there is shown one embodiment of the construction of the clip 17 and the manner that it can be attached to the underside of the yoke 11. Typically the clip may be made out of 20 AWG phosphor bronze spring wire and has a pair of elongated members 18 and 19 which parallel each other and the long side of the slot 14 in the yoke 11. The gap 20 between these two members is narrower than the corresponding gap in the slot 14. Ordinarily the mounting screw 15 that is inserted through the slot 14 is free and loose to allow the screw to be manipulated as need be in order to make it easy to insert into the threaded mounting hole in the flush box in the event the flush box and the mounting yoke are not accurately aligned. This is usually the case. Both ends of member 18 are bent 90° downward (as viewed in FIG. 2) to form arms and the righthand end of the member 19 is similarly bent. At their extremities, these arms are rigidly attached, such as by spot welding, to the underside of the yoke 11. One end of the member 19 remains unattached. When the screw 15 is inserted through the slot 14 and between the members 18 and 19, it causes the former to bow upward a slight amount and forces the latter downward from its unstressed position, as illustrated by the shadow line, to the position illustrated by the full heavy line. The elasticity of these members is such that they then press snugly against the shank of the screw to make a good low resistance electrical contact thereto. The screw can still be manipulated sufficiently as need be to seek the mating threaded hole in the mounting flush box. The members are flexible enough so that if the screw is withdrawn to detach the unit, they return to their unstressed condition. It should be noted that there are three circuit paths which are electrically in parallel between the screw and the mounting yoke 11. These are from the screw shank through each approximate half of the member 18 to their weldments on the yoke 11 and through approximately one-half of the member 19 to its welded joint on the yoke 11.

Figure 3:
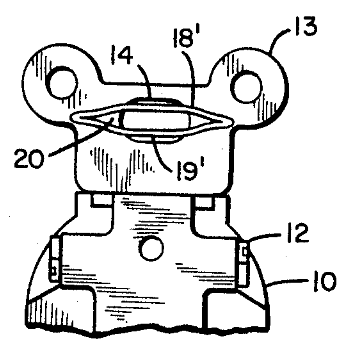
FIG. 3 is an exploded view of another embodiment of the invention.
Figure 4:
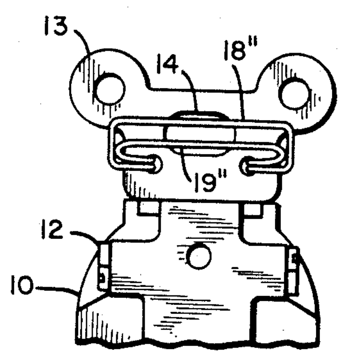
FIG. 4 is an exploded view showing still another embodiment of the invention.

FIGS. 3 and 4 illustrate other embodiments of the invention. In the former the ends of the parallel members 18′ and 19′ are respectively bent downward and upward and are welded at their extremities to the underside of the yoke 11. This construction has certain advantages in that it is the simplest and so, the least expensive, it has the shortest wired path from the screw shank to the yoke and it provides four paths which are in parallel electrically between the shank of the screw and the yoke. It has a disadvantage in that when the members 18′ and 19′ are bowed out by the insertion of the mounting screw, they tend to take a permanent set because they lack the degree of flexibility found in the other described embodiments.

In FIG. 4, the two parallel members 18″ and 19″ have arms bent downward at about 90° but these arms form a loop before their extremities are attached by being welded to the mounting yoke 11 on opposite sides of the slot 14. This type of construction provides the parallel members with a greater degree of flexibility so that the mounting screw can be manipulated easier over a wider range and inserted and removed many times without the members taking a permanent distorted set.

It can be visualized that in all of the described embodiments and other variations which are not illustrated but which come within the teachings of this invention, the low resistance path is immediately established when the mounting screw is threaded into its mating hole in the flush box. This requires no extra hardware and it ensures that an automatic ground is established and will not be mistakenly overlooked when the wall unit is installed. Furthermore, it can be seen that the only additional cost is that which must be alotted to making the clip and attaching it to the mounting yoke which ordinarily can be conveniently done when the unit is manufactured or assembled so that it becomes an integral part of the unit. There is no added labor for installation by the tradesman.

Although for most purposes, adequate grounding may be achieved in the manner described. It is contemplated that further means may be provided to supplement or enhance the grounding connection. First of all, of course, a good elctrically conductive material should go into the making of the screw. Furthermore, the screw threads may be coated with a layer of soft electrically conductive material such as common solder. The solder coating not only ensures a snug fit of the screw threads to the mating threads in the flush box 16 and a good electrical connection between the parallel members 18 and 19 of clip 17 to the screw threads, but it also provides a more extensive electrical contact area and prevents corrosive material or moisture from entering various recesses or openings to impair the electrical connection between the flush box 16 and the clip 17.

Ordinarily, the electrical units are packed by the manufacturer with their mounting screws inserted in the respective slots and small cardboard washers are used to hold the screws in place in the slots. Because these washers are made of an insulating material, they have to be removed when the receptacle is mounted in its flush box. This is oftentimes overlooked. It can be observed that the present invention serves the additional function of holding the mounting screws in place so that the cardboard washers are no longer needed.

A double receptacle having a mounting clip of the nature illustrated in FIG. 3 was mounted to a flush box with the mounting screw only part way threaded into the hole in the flush box. A test was performed by passing a 30-ampere current between the flush box and the yoke. The normal drop between the yoke and the flush box was measured, under these conditions, as ranging between 10 and 14 millivolts. In a similar fashion the embodiments illustrated in FIGS. 2 and 4 were also tested and had millivolt drops in the order of 2 to 4 millivolts higher than that for the FIG. 3 embodiment. As a further test, cotton was placed loosely around the receptacle and the flush box with the receptacle mounted in the flush box in the described manner. A momentary 1000-ampere short through the grounding circuit was supplied with no resulting sign of fire or burning of the cotton, indicating that no sparking or arcing had occurred.

We claim:

1. For an electrical unit which has a metal mounting yoke for attaching the unit to a metal flush box with screws, apparatus for making low resistance electrical connection between the yoke and the flush box, comprising: a flexible metallic clip fixedly attached with low electrical resistance to the metal mounting yoke; said clip having an opening aligned with the screw-receiving slot in the yoke for receiving a mounting screw inserted in said slot; said opening being smaller than the slot such that the clip makes snug but yieldable pressure contact with the screw shank when the screw is inserted through the slot for low resistance electrical connection between te screw and the yoke and for holding the inserted screw in position when not threaded in the flush box.

2. The invention as described in claim 1, wherein said clip comprises: at least two spring wire members located on the underside of the metal yoke with each member securely fastened at at least one end to the yoke; said members arranged to define an opening aligned with the slot for receiving the mounting screw when inserted through the slot; the dimension of the opening being less than the outer diameter of the screw threads; the arrangement being such that said members are forced apart by the screw shank when the screw is inserted through the slot so that said members press snugly against at least two separate points on the screw shank.

3. The invention as in claim 2 wherein said members comprise: a pair of spaced-apart parallel spring wire members each having an end bonded rigidly to the yoke, the gap between said members defining an opening for receiving the inserted mounting screw.

4. The invention as in claim 2 wherin said members are parallel to the elongated sides of said slot and are spaced apart to define an opening which is smaller than the narrow dimension of said slot, the shank of the inserted mounting screw forcing said parallel members apart when the screw is inserted; said members being characterized by their elasticity for making pressure contact against the inserted screw shank.

5. The invention as described in claim 4 wherein both of said parallel members are bonded to the metallic mounting yoke at both extremities for providing four electrically parallel paths between the screw shank and said yoke.

6. For an electrical wall unit which has a metal mounting yoke for attaching the unit to a metal flush box with screws, apparatus for making a low resistance electrical connection between the yoke and the flush box, comprising in combination: a mounting screw made of highly conductive material having its threads coated with a thin layer of soft, highly conductive material inserted through the mounting slot in the metal mounting yoke a flexible metal clip fixedly attached to the underside of the metal mounting yoke, said clip having at least two elongated members making yieldable pressing contact against the coating layer on the inserted mounting screw at at least two separate points on the screw shank for providing at least two electrically parallel low resistance paths between the screw and the yoke.

7. The invention as described in claim 6 wherein said two members are constructed out of 20 AWG spring wire and at least one end of each is permanently bonded to the underside of the metal yoke.

References Cited

UNITED STATES PATENTS

| | | | |
|---|---|---|---|
| 3,064,224 | 11/1962 | Wiley | 339—14 |
| 3,126,239 | 3/1964 | Winter et al. | 339—14 |
| 3,167,372 | 1/1965 | Lawson | 339—14 |
| 3,192,308 | 6/1965 | Van Horssen et al. | 174—89 |

FOREIGN PATENTS

| | | |
|---|---|---|
| 208,432 | 4/1960 | Austria. |
| 661,611 | 11/1951 | Great Britain. |

RICHARD E. MOORE, *Primary Examiner.*

PATRICK A. CLIFFORD, *Assistant Examiner.*

U.S. Cl. X.R.

339—133, 278